UNITED STATES PATENT OFFICE.

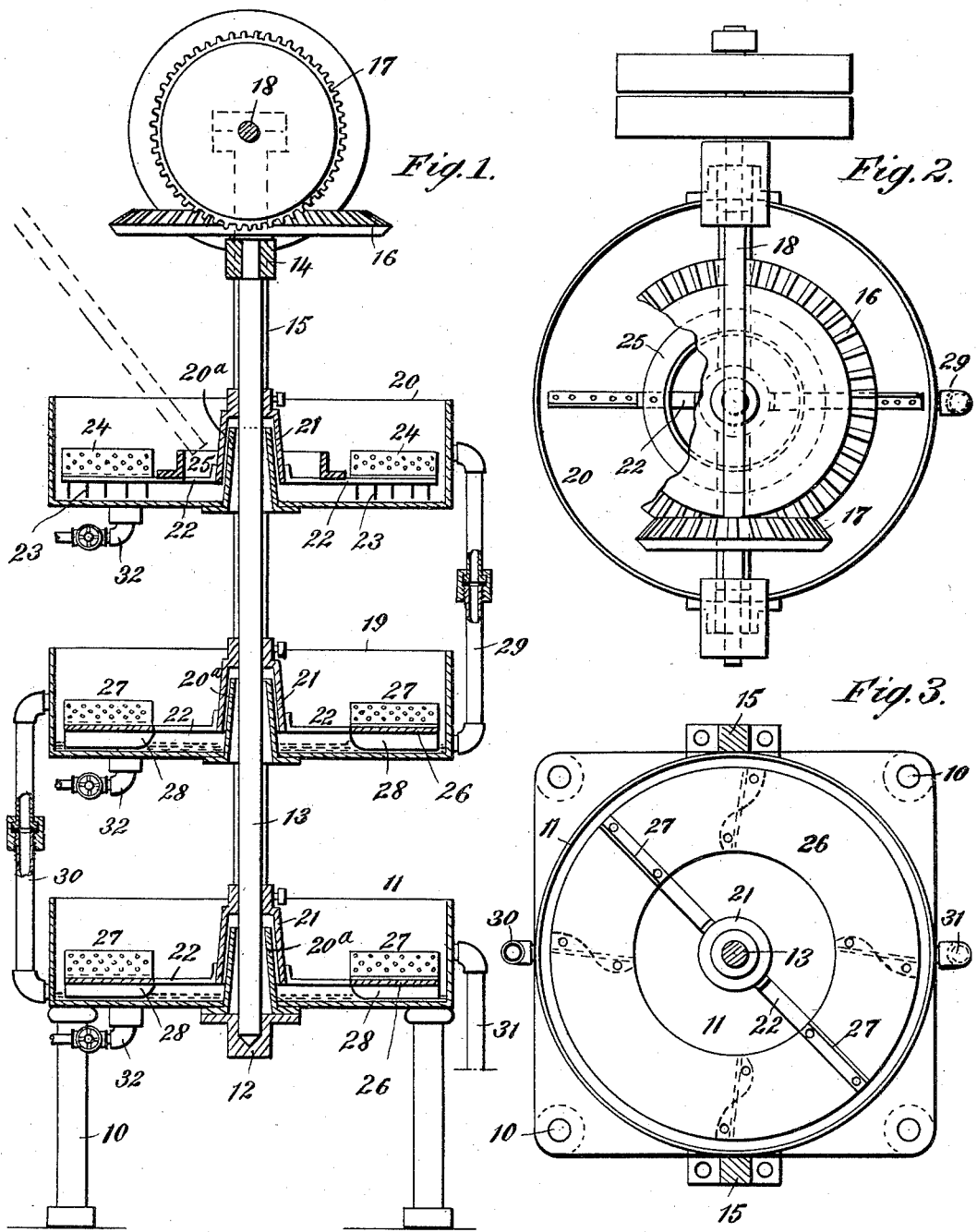

JACOB RODERMOND, OF NEW YORK, N. Y.

CONCENTRATOR AND AMALGAMATOR.

SPECIFICATION forming part of Letters Patent No. 456,852, dated July 28, 1891.

Application filed July 22, 1890. Serial No. 359,502. (No model.)

*To all whom it may concern:*

Be it known that I, JACOB RODERMOND, of New York city, in the county and State of New York, have invented a new and useful Improvement in Concentrators and Amalgamators, of which the following is a full, clear, and exact description.

My invention relates to an improved concentrator and amalgamator for treating ores and like substances, and has for its object to provide a device of simple, durable, and economical construction; and the invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through the machine. Fig. 2 is a plan view of the same, parts being broken away. Fig. 3 is a horizontal section taken through the machine above the lower pan, and Fig. 4 is a detail perspective view of one of the agitators.

In the construction of the machine the base thereof is preferably formed of four or more uprights 10, upon which uprights the lower pan 11 is supported, which pan is preferably circular in shape. Below the center of the pan a socket 12 is formed, sustained in position by connection with the base, in which socket the lower end of a vertical shaft 13 is journaled. The shaft 13 at its upper end is journaled in bearings 14, which bearings are attached, preferably, to two opposed standards 15, attached to the sides of the base, as illustrated in Figs. 1 and 3. The shaft is provided at its upper end with an attached horizontal bevel-gear 16, which meshes with a vertical pinion 17, fast upon a transverse drive-shaft 18, which drive-shaft is preferably journaled in the upper ends of the standards 15; but the perpendicular shaft 13 may be driven in any other suitable or approved manner, if in practice it is found desirable.

Two pans 19 and 20 are preferably arranged at suitable distances apart above the lower pan 11, and like the lower pan are preferably made circular in shape. The upper pans are rigidly attached to the uprights or standards 15, and each pan is provided with a conical central upright flange $20^a$, the flange being open at the top and the pan open at the bottom or base of the flange. The object of the flange is to admit of the upward passage of the perpendicular shaft 13 through the center of all of the pans. A conical hub 21 is fitted over the flange of each of the pans, the said hubs being firmly attached to the perpendicular shaft 13. The hub of the upper pan has radiated from its base two horizontal arms 22, which arms are located at opposite sides, the said arms being provided with downwardly-extending teeth or spurs 23 upon their under faces and with upwardly-projecting perforated plates 24, attached to their upper faces at their outer ends, as is best shown in Fig. 1. The arms 22 also serve to support a circular cup 25, which cup surrounds the hub 21. The hubs 21 of the lower pans 11 and 19 are also provided with radial arms 22; but the said arms are attached at their outer ends to or are formed integral with a horizontally-located ring 26. The said ring upon its upper face at opposite sides has secured thereto upright perforated plates 27, similar to the plates 24 of the upper pan.

Three or more, preferably four, agitators 28 are secured to the lower face of the rings 26. These agitators not only serve as such, but by reason of their peculiar construction also serve to direct the contents of the pan or receptacle in which they are revolved constantly in the direction of the center, and they are furthermore readily attached to or detached from the rings. The agitator consists of a plate or casting comprising a horizontal body $a$, adapted to be bolted or similarly attached to the rings, and a downwardly-extending blade $a'$, which blade is spiral, having a decidedly compound curve longitudinally imparted thereto. The blade extends from end to end of the body, and the ends are curved laterally in opposite directions.

Mercury is placed in the lower and intermediate pans, but is omitted from the upper pan. The mercury in the pans is usually about an inch in depth. The upper and intermediate pans 19 and 20 are connected at one side by a pipe 29, which pipe may be made in two sections and coupled by a union or other suitable fitting, as illustrated.

The connection of the pipe with the upper pan is effected about midway between the top and bottom, and the connection of the pipe with the intermediate pan is made at a point near the bottom thereof. A similar pipe 30 is employed to connect the intermediate pan with the lower pan, the latter pipe being located opposite the pipe 29, and the connection is effected in the same manner, the pipe being made to enter the intermediate pan at a point about midway between its top and bottom and the lower pan near the bottom. The lower pan is further provided upon its opposite side with an offtake-pipe 31, connected therewith between its top and bottom about midway, and each of the pans has connected with its bottom a drainage-pipe 32. The pipe 31 may communicate with any convenient receptacle, as may likewise the pipes 32.

In operation the ore, if ore is to be treated, is emptied into the cup 25 together with water, through which cup the water and ore flow to the bottom of the upper pan. The arms 22, constantly revolving, thoroughly agitate the material entered, and as the flow of material into the cup is continuous when the wash reaches the level of the upper end of the connecting-tube 29 it passes down said tube and enters the intermediate pan 19, which contains mercury, where it is agitated in the presence of mercury by the revolution of the ring 26. The wash from the intermediate pan finds its way down through the connecting-tube 30 into the lower pan, where it is again treated to a contact with mercury under centrifugal movement. The wash from the lower pan flows off through the tube or pipe 31, and when it is desired to clean the pans valves are opened, said valves being located in the drainage-pipes 32.

I desire it to be distinctly understood that I do not confine myself to any particular number of pans, and that any form of tubular connection may be employed between the pans.

Having thus described my invention, I claim as new and desire to secure by Letters Patent—

1. In an apparatus of the character described, the combination, with a receiving-pan and horizontal rotatable arms located in said pan, provided with teeth upon their lower faces, perforated upright blades secured to their upper faces, and a bottomless cup encircling their central portion, of a lower pan adapted to contain mercury, an apertured disk located in the lower pan, provided with perforated plates attached to its upper face, and combined agitating and gathering devices secured to its lower face, the said devices consisting of a horizontal body and a spiral blade depending therefrom having its ends laterally curved in opposite directions, and a tubular connection between the upper portion of the upper pan and the lower portion of the lower pan, substantially as and for the purpose specified.

2. In an amalgamator, the combination, with the pan, of a revoluble disk or arm journaled in the pan and agitating and gathering devices attached thereto, the latter consisting of a horizontal body and a spiral blade located at an angle to the body and having its ends laterally curved in opposite directions, substantially as described.

JACOB RODERMOND.

Witnesses:
SAMUEL S. HADDEN,
FRANK G. SWARTWOUT.